March 10, 1925.                                                  1,529,191
C. F. KETTERING
MAGNETIC CLUTCH
Filed Sept. 25, 1922         2 Sheets-Sheet 1

Witnesses
G.H. Wallace
Warren Schmieding

Inventor
Charles F. Kettering
J. Ralph Fehr
his Attorney

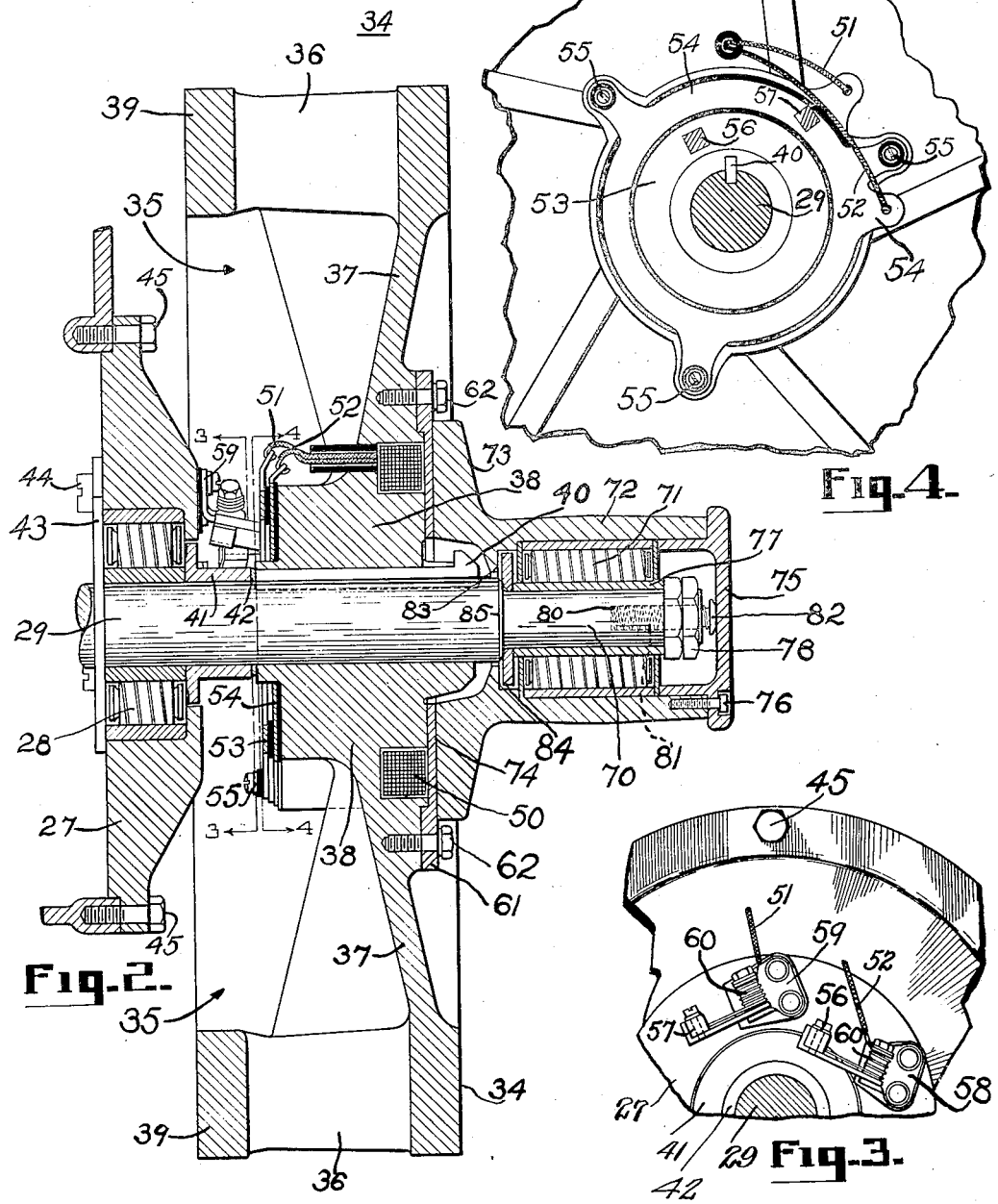

Patented Mar. 10, 1925.

1,529,191

UNITED STATES PATENT OFFICE.

CHARLES F. KETTERING, OF DAYTON, OHIO, ASSIGNOR TO DELCO-LIGHT COMPANY, OF DAYTON, OHIO, A CORPORATION OF DELAWARE.

MAGNETIC CLUTCH.

Application filed September 25, 1922. Serial No. 590,253.

*To all whom it may concern:*

Be it known that I, CHARLES F. KETTERING, a citizen of the United States of America, residing at Dayton, county of Montgomery, and State of Ohio, have invented certain new and useful Improvements in Magnetic Clutches, of which the following is a full, clear, and exact description.

This invention relates to magnetic clutches and has for its objects a provision of a magnet clutch by means of which an engine may be conveniently connected directly with a pulley for driving the latter.

Further objects and advantages of the present invention will be apparent from the following description, reference being had to the accompanying drawings, wherein a preferred form of one embodiment of the present invention is clearly shown.

In the drawings:

Fig. 2 is a sectional view of the engine flywheel and support therefor together with the magnetic clutch and pulley driven by the flywheel through the clutch;

Fig. 3 is a sectional view taken on the line 3—3 of Fig. 2; and

Fig. 4 is a sectional view taken on the line 4—4 of Fig. 2.

Figure 1:
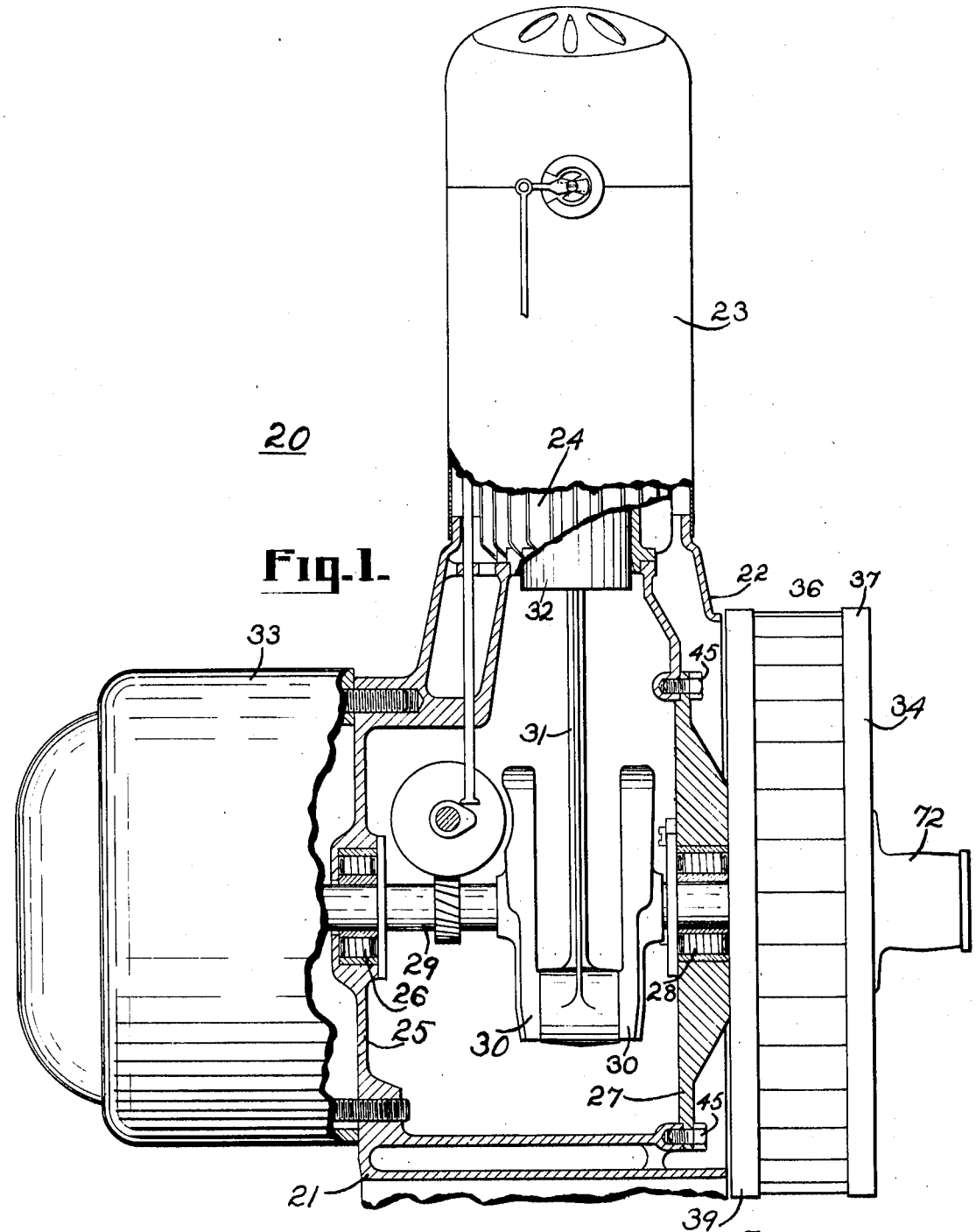
Fig. 1 is a side elevation partly in section of an engine embodying the present invention.

Referring to the drawings, 20 designates an internal-combustion engine of the type claimed and described in the patent to Charles F. Kettering and William A. Chryst, No. 1,341,327, issued May 25, 1920. This engine 20 comprises a crank case 21 partly surrounded by a jacket 22 which supports a draft tube 23 surrounding an engine cylinder 24. The crank case 21 is provided with an integral wall 25 carrying a bearing 26. The crank shaft 29 having crank arms 30 is journalled upon bearings 26 and 28 and is connected by a connecting rod 31 with a piston 32 slidable within the cylinder 24. Shaft 29 carries at its left end an armature not shown forming part of a generator 33 secured to the crank case 21, and at its other end a flywheel 34 constructed to operate as a cooling fan, there being a central fan inlet at 35 leading to discharge openings between a series of peripherally arranged blades 36. These blades 36 extend from a web 37 formed integrally with a flywheel hub 38, and the ends of the blades 36 projecting away from the fan hub 37 are tied together by means of integral connecting ring 39.

The hub 38, of flywheel 34 is attached by key 40 to the crank shaft 29 and is spaced from the bearing 28 by means of collar 41 and washer 42. Bearing 28 is retained within a recess in an end wall 27 by means of a retaining plate 43 attached to the wall 27 by means of screws 44. Wall 27 is attached to crank case 21 by means of screws 45.

The hub 38 is provided with an annular groove for receiving an annular magnet coil 50 and terminals 51 and 52 connected with collector disks 53 and 54 respectively which are attached to the hub 38 by means of screws 55 but are insulated from each other and from the hub 38. These collector rings 53 and 54 are adapted to be engaged by brushes 56 and 57 respectively carried by brackets 58 and 59 respectively which are supported by the end wall 27 but are insulated therefrom. Springs 60 yieldingly press the brushes against their respective collecting rings. The coil 50 is retained in position by means of a plate 61 attached to the flywheel by screws 62 and the outer face of this disk 61 is machined with a plane surface at right angles to the axis of shaft 29.

The shaft 29 is provided with a reduced end portion 70 for supporting a roller bearing 71 upon which is journalled a pulley 72 having a flange 73 with its outer surface 74 machined so as to be parallel with the surface of cover 61 and in order that the surfaces of 74 and 61 will substantially coincide when these parts are attracted into engagement with each other. The bearing 71 is positioned within a recess formed within the pulley 72 and is retained in position by means of a cap 75 attached to the pulley by means of screws 76. The sleeve 77 of the bearing 71 is held in position by means of nuts 78 threaded upon the end of the shaft extension 70. Said shaft extension 70 is provided with a central bore 80 within which is located a spring 81 which yieldingly presses a plunger 82 against the inner surface of cap 75. This spring therefore acts to produce a separation of the contacting surfaces of plate 61 and the surface 74 of flange 73 so that there will be no frictional contact between the flywheel and pulley after the magnet coil 50 is deenergized.

As shown in Fig. 2 the parts 61 and 74 are shown in attracted position but when current through the coil 50 is discontinued the spring 81 will push the pulley 72 to the right as viewed in Fig. 2 until the ledge 83 strikes against a washer 84 which is held between the bearing sleeve 77 and the shoulder 85 of the shaft 29.

This type of clutch is particularly advantageous in connection with internal-combustion engines and particularly of the type described in the Patent No. 1,341,327. By the use of the present invention an electric generating plant may be used also to provide power direct from the flywheel of the engine. By the closing of a switch the clutch may be connected with a source of current so that the engine may drive through the flywheel pulley 72 a machine which is belted to it. If it is desired to stop the machine the engine need not be stopped but the clutch is simply deenergized whereupon the spring 81 will disengage the clutch surfaces so as to insure reducing friction upon the engine as much as possible.

The type of clutch described is particularly useful in connection with engines of the type described since the rotating elements of the clutch are all carried by the engine flywheel and do not require any additional space. The brushes for carrying current are carried by the engine frame and are protected by the flywheel. The pulley includes the clutch armature element and requires no more space than an ordinary pulley directly attached to the flywheel.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What I claim is as follows:

1. In magnetic clutch mechanism for engines and in combination with an engine having a crank case provided with end walls, a crank shaft supported in bearings carried by said end walls and the ends of which shaft extend beyond said bearings; a flywheel secured to said crank shaft and driven thereby; a clutch magnet winding carried by said flywheel; collecting members carried by said flywheel and to which the terminals of said winding are connected; brushes supported by the end wall aforesaid adjacent said flywheel, and which brushes contact with said collecting members; a pulley loosely mounted upon the extremity of said crank shaft outside said flywheel and having a radially extending flange arranged adjacent said clutch magnet winding, and a hollow hub open at its outer end; a cap for closing the outer end of said hub; a spring arranged within a central bore provided in the extremity of said crank shaft; a plunger arranged in said bore and pressed outward by said spring, and the extremity of which plunger abuts against the inner surface of said cap; and means for limiting the outward movement of said pulley produced by the spring aforesaid.

2. In magnetic clutch mechanism and in combination with an engine having a crank case provided with end walls, a crank shaft supported in bearings carried by said end walls and the ends of which shaft extend beyond said bearings; a flywheel secured to one end of said crank shaft and driven thereby, and having an annular recess in its outer side; a clutch magnet winding located within said recess; collecting members carried by said flywheel and attached to the terminals of said winding; brushes supported by the end wall aforesaid adjacent said flywheel, and which brushes contact with said collecting members; an annular cover plate secured to said flywheel and overlying said clutch magnet winding; a pulley loosely mounted upon the extremity of said shaft outside said flywheel, and having a radially extending flange lying alongside said plate and extending over said clutch magnet winding; a spring associated with the end aforesaid of said crank shaft and acting upon said pulley to force it outward and away from said plate; and co-operating stop members carried by said pulley and by said shaft for limiting the outward movement of said pulley.

In testimony whereof I hereto affix my signature.

CHARLES F. KETTERING.

Witnesses:
MILDRED PEARE,
WARREN SCHMIEDING.